Patented Mar. 27, 1923.

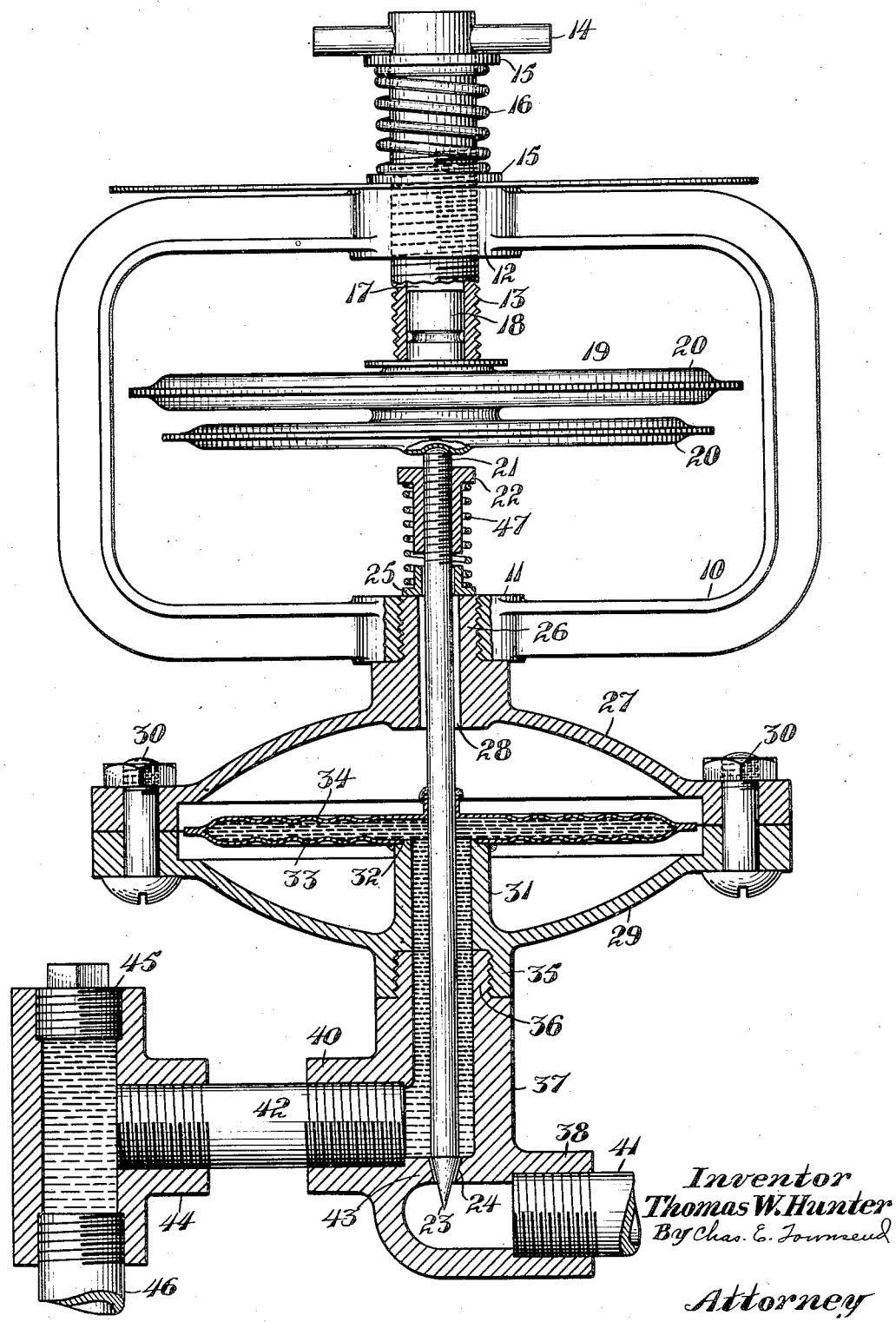

1,449,998

UNITED STATES PATENT OFFICE.

THOMAS W. HUNTER, OF OAKLAND, CALIFORNIA.

FLUID REGULATOR.

Application filed July 6, 1921. Serial No. 482,645.

*To all whom it may concern:*

Be it known that I, THOMAS W. HUNTER, a citizen of the United States, residing at Oakland, in the county of Alameda and State of California, have invented new and useful Improvements in Fluid Regulators, of which the following is a specification.

This invention relates to a fluid regulator and particularly pertains to a thermostat control for fluids. Heretofore it has been common to thermostatically regulate the flow of a fluid by the expansion and contraction of metal discs between which the volume of light gravity liquid is enclosed, said expansion and contraction operating a valve member usually passing through a stuffing gland. Due to the friction of the packing upon the valve stem, the thermostat does not act sensitively and often sticks.

It is a principal object of the present invention, therefore, to provide an operating means for the thermostat, and packing means for the reciprocating valve stem, whereby the valve will be sensitive at all times to the influence of the thermostat and will be instantly relieved when the pressure of the thermostat is discontinued.

The invention contemplates the use of an expansion thermostat acting against a valve stem, said valve stem being secured to a yieldable metal diaphragm, and this diaphragm in turn being secured to a similar diaphragm through which the stem passes and which second diaphragm is fastened to the bearing within which the stem reciprocates.

The invention is illustrated by way of example in the accompanying drawing in which—

The figure is a view in vertical section and elevation showing the complete invention.

The regulating device, as here shown, has been designed for use in connection with poultry raising appliances, such as incubators and brooders, to regulate the flow of fuel to their heating device, although it will be understood that the details of construction of the present invention might be readily used in connection with other thermostat regulating apparatus.

In the drawing 10 indicates a yoke frame member having vertically aligned bearings 11 and 12, the upper bearing 12 carrying a threaded stem 13 adapted to be rotated by a pin 14. This stem is fitted with washers 15 between which a compression spring 16 is disposed. The threaded stem 13 is formed with a central bore 17 which receives an upwardly projecting pin 18 of a thermostat diaphragm structure 19. This arrangement is of conventional design, being formed by sets of circumferentially corrugated discs 20 which are united along their edges to form intermediate compartments in which a highly volatile liquid may be placed. The lower end of the diaphragm structure rests upon the upper end of a floating valve member 21. This end of the valve is exteriorly threaded to receive a threaded sleeve 22. The lower end of the said stem is formed with a conical point 23 to seat upon a conical valve seat 24. A sleeve 25 is loosely mounted around the valve stem and rests against the upper face of the lower frame bearing 11. This bearing is interiorly threaded to receive a boss 26 of a casing member 27. This boss has a central bore 28 therethrough. The valve stem 21 is adapted to reciprocate through this bore and it is preferred to form the bore of a diameter somewhat larger than the stem so that there will be no frictional engagement between the surfaces of the bore and the stem. The casing member 27 is convexed and is complementary to a similarly formed casing member 29, the two being secured together at points around their circumference by bolts 30. The lower casing member 29 is formed with an upwardly extending boss 31. This boss is formed with a small shoulder 32 to project into an opening in a circumferentially corrugated diaphragm member 33. This diaphragm member is similar in its construction to the ones used for the thermostat control, although in the present instance it is provided as a packing means for the valve stem. The diaphragm member 33, which is soldered or otherwise secured to the end of the boss 31, is secured along its circumferential edge to an upper corrugated diaphragm 34. This diaphragm is fixed to the valve stem and, as the valve stem projects through the central opening in the lower diaphragm member 33, the stem will be yieldably held as supported by the upper diaphragm member 34. An internally threaded boss 35 is formed in longitudinal alignment with the boss 33 and receives the threaded extension 36 of a valve housing 37. This housing is formed with an inlet connection 38 and an outlet connection 40. A feed pipe 41 is threaded into the connection 38 and a supply pipe 42 is threaded into the connection 40. Interposed between the two connections is a horizontally disposed partition wall 43. This wall is formed with the tapered valve opening 24, previously mentioned. A T connection 44 is secured to the pipe 42 and forms an air vent when starting the flow of liquid or gas through the apparatus. The upper leg of this T is provided with a removable plug 45, while the lower end receives the supply pipe 46 leading to a desired apparatus, such as a fuel burner.

In order to make it possible to accurately adjust the valve stem and to determine the influence of the thermostat diaphragm 19 thereon, a helical spring 47 is disposed between the shoulder of the threaded stem sleeve 22 and washer 25. By this arrangement the amount of movement possible for the valve is determined, and at the same time it will be insured that the valve shall not stick.

In the operation of the present invention the apparatus is assembled as shown, and the pipes 41 and 46 connected to a suitable supply and outlet apparatus. The thermostat is then disposed in a desired position to be influenced by the temperature of the surrounding atmosphere. The threaded sleeve 22 is then screwed down onto the stem, thus determining the range of movement of the valve. Attention is directed to the fact that this adjustment of the threaded sleeve does not materially affect the tension of the compression spring 47, as this spring merely holds the sleeve in its adjusted position, and at the same time automatically lifts the valve point from its seat when the thermostat diaphragms contract, thus insuring that the valve will not stick on its seat. The threaded stem 13 may then be tightened down against the diaphragm to regulate the effective movement of the diaphragm. In the event that a liquid fuel is used, the threaded plug 45 is then removed from the T and the liquid allowed to flow through the pipe 41, upwardly through the tapered valve opening 24 and from thence through the pipe 42 and T 44 to the pipe 46. When these pipes have all been filled the plug 45 is again threaded into position. This will prevent the forming of air bubbles in the pipe line. Attention is directed to the fact that the oil within the valve housing 37 may fill the bore through which the valve stem extends and also fill the space between the diaphragm members 33 and 34. As the liquid has a very small pressure, as compared with the action of the thermostat, the internal pressure produced between the diaphragms 33 and 34 will not be sufficient to resist the movement of the thermostat diaphragms and as they operate the stem may instantly move without being retarded by the surrounding packing. It will be evident, therefore, that a very sensitive thermostatic adjustment may be provided, and that while insuring that the valve will not stick, and at the same time the effective movement of the valve may be accurately regulated.

While I have shown the preferred form of my invention, it is to be understood that various changes may be made by those skilled in the art without departing from the spirit of the invention.

Having thus described my invention what I claim and desire to secure by Letters Patent is:

1. A thermostatically controlled regulating valve comprising a valve housing having induction and eduction connections, an intermediate partition wall between said connections and having an opening formed therethrough, a floating valve member adapted to co-operate with said opening to control the flow of fluid therethrough, said valve housing having a chamber therein with an open outer end through which said floating valve member extends, a diaphragm secured around the open end of said chamber, a second diaphragm secured to the marginal edge of said first diaphragm and through which said floating valve member extends, said second diaphragm being secured around the said floating valve member approximately at the center thereof, said diaphragms constituting a frictionless support and guide for said floating valve member and also packing means for the open end of the said chamber, a frame rigidly supported from said valve housing, an adjusting member carried by the frame in longitudinal alignment with the floating valve member and movable toward and away therefrom, and a thermosensitive diaphragm interposed between the adjusting member and the end of the floating valve member.

2. A thermostatically controlled regulating valve comprising a valve housing having induction and eduction connections, an intermediate partition wall between said connections and having an opening formed therethrough, a floating valve member adapted to co-operate with said opening to control the flow of fluid therethrough, said valve housing having a chamber therein with an open outer end through which said floating valve member extends, a diaphragm secured around the open end of said chamber, a second diaphragm secured to the marginal edge of said first diaphragm and through which said floating valve member extends, said second diaphragm being secured around the said floating valve member approximately at the center thereof, said diaphragms constituting a frictionless support and guide for said floating valve member and also packing means for the open end of the said chamber, a frame rigidly supported from said valve housing, an adjusting member carried by the frame in longitudinal alignment with the floating valve member and movable toward and away therefrom, a thermosensitive diaphragm interposed between the adjusting member and the end of the floating valve member, the outer end of the valve stem being threaded and fitted with a nut, an expansion spring interposed between the nut and the frame to assist in maintaining the floating valve member away from the valve opening when the thermosensitive diaphragm is ineffective.

3. A device of the character described comprising a valve housing having induction and eduction connections; an intermediate partition wall formed with a tapered valve seat therethrough; a reciprocating valve stem adapted to operate relative to said seat; said stem extending through a valve chamber in the housing, the outer end of which is opened; a packing diaphragm secured around the mouth of said valve chamber; a second diaphragm secured to the marginal edge of said first diaphragm and through the center of which the valve stem extends and is secured; a casing for said diaphragm; a yoke member supported from said casing; an adjusting screw carried by said yoke and disposed in longitudinal alignment with the central axis of the valve stem; and a thermostat diaphragm interposed between the end of the valve stem and the adjusting screw.

4. A device of the character described comprising a valve housing having induction and eduction connections; an intermediate partition wall formed with a tapered valve seat therethrough; a reciprocating valve stem adapted to operate relative to said seat; said stem extending through a valve chamber in the housing, the outer end of which is opened; a packing diaphragm secured around the mouth of said valve chamber; a second diaphragm secured to the marginal edge of said first diaphragm and through the center of which the valve stem extends and is secured; a casing for said diaphragm; a yoke member supported from said casing; an adjusting screw carried by the yoke and disposed in longitudinal alignment with the central axis of the valve stem; a thermostat diaphragm interposed between the end of the valve stem and the adjusting screw; and means for regulating the maximum lift of the valve stem from its seat.

5. A device of the character described comprising a valve housing having induction and eduction connections; an intermediate partition wall formed with a tapered valve seat therethrough; a reciprocating valve stem adapted to operate relative to said seat; said stem extending through a valve chamber in the housing, the outer end of which is opened; a packing diaphragm secured around the mouth of said valve chamber; a second diaphragm secured to the marginal edge of said first diaphragm and through the center of which the valve stem extends and is secured; a housing for said diaphragm; a yoke member supported from said casing; an adjusting screw carried by the yoke and disposed in longitudinal alignment with the central axis of the valve stem; a thermostat diaphragm interposed between the end of the valve stem and the adjusting screw; means for regulating the maximum lift of the valve stem from its seat; and means for automatically lifting the valve stem from its seat when the pressure of the thermostat diaphragm is discontinued.

THOMAS W. HUNTER.